June 19, 1962 F. C. PALLER 3,039,759
UNIVERSAL OVERLOAD SPRING FOR LEAF SPRING
ASSEMBLIES OF VEHICLES
Filed March 6, 1961
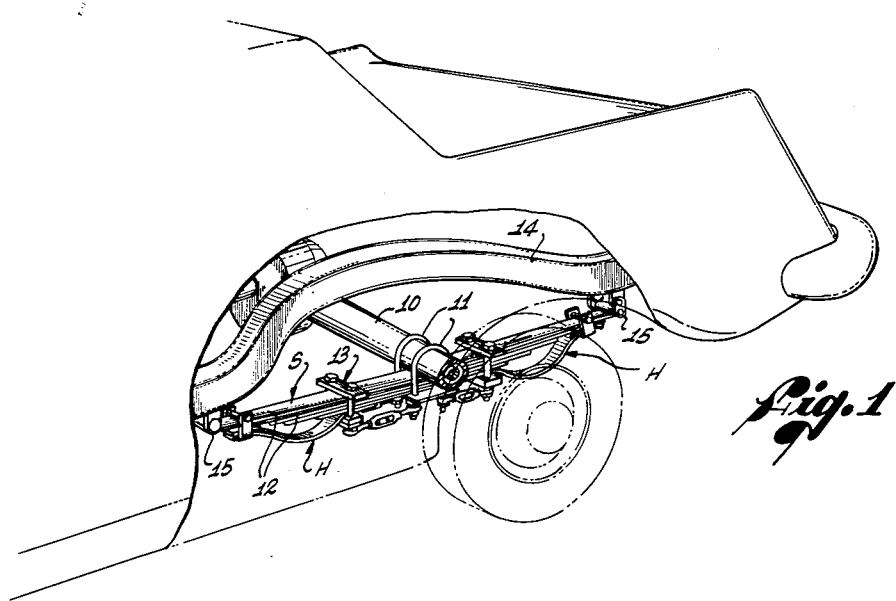
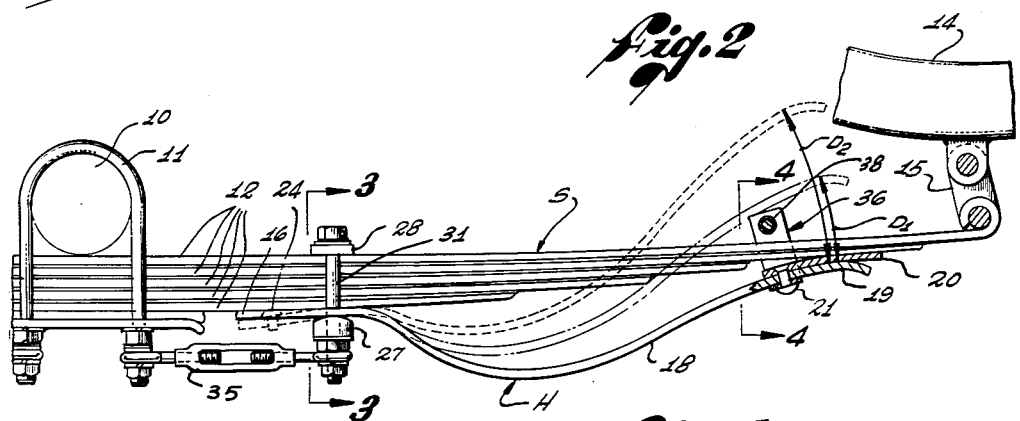
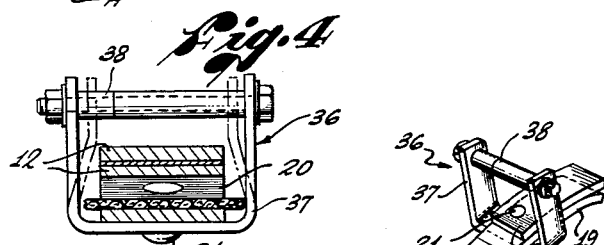
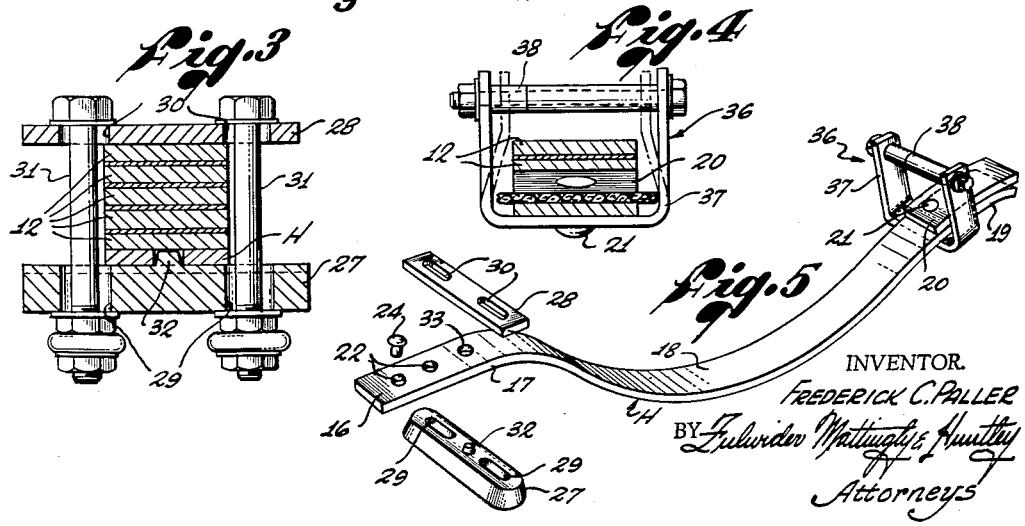
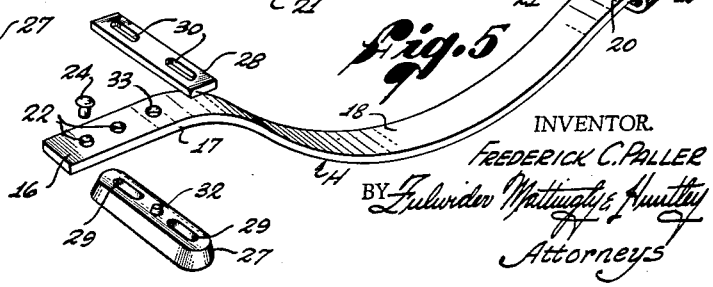
INVENTOR.
FREDERICK C. PALLER
Attorneys

United States Patent Office

3,039,759
Patented June 19, 1962

3,039,759
UNIVERSAL OVERLOAD SPRING FOR LEAF
SPRING ASSEMBLIES OF VEHICLES
Frederick C. Paller, Northridge, Calif., assignor to Superior Industries, Inc., North Hollywood, Calif., a corporation of California
Filed Mar. 6, 1961, Ser. No. 93,395
1 Claim. (Cl. 267—48)

This invention relates generally to suspension systems assemblies for automobiles and the like, and more particularly to a unique leaf spring assembly.

Most automobiles, trucks, buses, and similar vehicles are provided with flexible leaf spring systems for suspending the vehicle frame from the running gear axle. Within a particular range of vehicle loadings, these systems are designed not only to maintain the proper position of the frame with respect to the running gear axle, but also to absorb most of the road shock before it is transmitted to the vehicle frame. However, when the vehicle is overloaded beyond this design range, the suspension system can malfunction in a number of different ways.

First and most noticeable, the overloaded portion of the vehicle frame will ride at a lower and unbalanced position. This condition can, in some cases, cause the vehicle to strike hitherto passable obstructions in the roadbed. In other cases, this overloading can cause a misalignment of connecting gears and the like which will damage them and possibly make the vehicle unsafe to operate.

A further result of overloading the suspension system is that it reduces the clearance between the running gear axle and the vehicle frame, thereby increasing the danger of damaging impact between the two when the vehicle is subjected to normal road shock. Further, such overloading causes the system to operate from a stiffer equilibrium position than intended by the manufacturer, thereby causing a greater proportion of road shocks to be transmitted from the running gear to the vehicle frame. All such effects also result in discomfort to passengers in the vehicle.

In order to strengthen a leaf spring suspension system that is subjected to an overload, it has become customary to provide one or more helper leaves, which are bowed spring elements fixed at their ends to the leaf spring assembly. Such a helper leaf must be able to compensate for the average overload, but not to overcompensate. Also, the helper leaf should restore the designed equilibrium position of the overloaded spring while at the same time adding a minimum of stiffness to the assembly's overall reaction to road shocks. In addition, the spring must be properly sized so that it can be mounted firmly and operate smoothly on the particular spring assembly being strengthened. And finally, the helper must permit the assembly to flex freely under road shocks without being subjected to damaging binding or buckling forces.

Helper leaves are essentially custom-made for use with particular types and sizes of leaf spring assemblies, and for particular overload conditions. Thus, one needs a wide variety of shapes and sizes of helper leaves in order to be able to fill orders for any particular need. However, because of the highly competitive and low profit margin characteristics of the automobile accessories market, it is impractical to stock a large variety of helper leaves.

Accordingly, it is a major object of my invention to provide a leaf spring assembly having a universal helper leaf which can be adjustably installed on any standard leaf spring assembly to provide a plurality of reinforcement strengths.

Another object of my invention is to provide a helper leaf mounting system which is adapted for use with leaf spring assemblies of different widths, and which eliminates the necessity for stocking a large variety of helper leaves for different leaf spring assemblies.

Another object of my invention is to provide a unique adjustable helper leaf structure for restoring the equilibrium position of an overloaded leaf spring assembly, while at the same time providing a minimum of interference with the normal stiffness and flexing properties of the assembly when subjected to road shocks.

The above and other objects and advantages of my invention will become apparent from the following description taken in conjunction with the accompanying drawings of an illustrative embodiment thereof, in which:

FIGURE 1 is a fragmentary perspective view of an automobile, partially broken away to reveal in perspective a leaf spring suspension system utilizing helper leaves according to my invention.

FIGURE 2 is a partial side elevation view of the leaf spring assembly of FIGURE 1;

FIGURE 3 is a sectional view taken along line 3—3 of FIGURE 2, illustrating the adjustable clamp structure of the assembly;

FIGURE 4 is a sectional view taken along line 4—4 of FIGURE 2, illustrating the detailed structure of the pressure arm clip of the assembly; and FIGURE 5 is a perspective view of my unique helper leaf, showing the parts of the adjusting mechanism in exploded perspective.

FIGURE 1 illustrates a standard vehicle suspension system S having two of my improved helper leaves H mounted on the underside thereof. As in conventional systems, the running gear axle 10, by means of axle clamps 11, supports the center of a conventional assembly S of semi-elliptic spring leaves 12. The vehicle frame 14 supports the ends of the spring assembly, as by shackling such ends to the frame at 15. In this system, road shock displacements of the running gear axle 10 are transmitted to the frame 14 through the spring assembly S. These displacements of the running gear axle subject the assembly S to a vibrating elastic tension which, with properly designed springs, absorbs a substantial portion of the road shocks in damped vibrational energy before they can be transmitted to the frame 14 of the automobile.

When the vehicle is subjected to an overload condition, the frame 14 and the ends of the spring assembly S which are shackled firmly to it are forced downwardly with respect to the axle 10 and with respect to the center of the spring assembly S. Thus, while each of the leaves 12 in the spring assembly S assumes, in the design equilibrium condition, either a flat or slightly downwardly convex configuration, the deformation produced by the overload will cause the axle 10 to ride closer to the frame 14 than in the equilibrium position shown in FIGURE 1, and will also cause the leaves 12 of the spring assembly S to assume under tension a somewhat upwardly convex configuration. As previously explained, this condition results in undesirable misalignment of the body frame 14 with respect to the axle 10, and also results in the spring assembly operating from an equilibrium position of greater tension, and correlatively greater stiffness, in which it absorbs a smaller portion of the road shocks to which the running gear axle 10 is subjected.

In order to alleviate the undesirable results of overloading, I provide a helper leaf H (seen best in FIGURES 2 and 5), one or more of which may be attached to the underside of the main spring assembly S. As is shown in FIGURE 5, my improved helper leaf comprises a strip of curved stiff spring metal, such as sheet steel, having reversely curved ends. Its numbered portions include an adjustment arm 16, a fulcrum portion 17, a bowed pressure arm 18, and a spring contact portion 19. As is shown in FIGURE 2, the helper leaf H is installed by firmly clamping the fulcrum portion 17 against the lower leaf 12 of the main spring assembly S. When thus installed, the pressure arm is bent downward from its unflexed condition, so that the contact portion 19 exerts an upward elastic pressure on the outer end of the spring assembly S, and hence, through the shackle 15, on the frame 14. This upward elastic pressure operates to counteract overload and restore the spring assembly to its intended equilibrium position.

In a spring assembly in accordance with my invention, the helper leaf H is fixed in place adjacent one end only, i.e., the fulcrum end as in FIGURE 2. This clamping arrangement permits the adjustment arm 16 and the contact portion 19 to move freely back and forth along the face of the spring S, as it flexes under road shock. I have found it desirable to provide the contact portion 19 with a wearing pad 20 of rubberized cloth or other similar plastic material to eliminate metal-to-metal rubbing friction, and reduce the noise that would otherwise obtain from this sliding motion of the contact portion against the spring face. This wearing pad 20 may be anchored to the helper H by a countersunk rivet 21 or other suitable fastener.

A number of advantages are obtained by this single point suspension of the helper leaf on the main spring assembly. First of all, it permits the elastic pressure of the helper to restore the equilibrium position of an overloaded suspension system while at the same time imposing a minimum of interference with the flexing properties of the spring, thereby permitting it to retain a maximal amount of its flexibility and resulting road shock absorption properties. In addition, the single point suspension avoids the tendency of prior art helper leaves, which are attached at multiple points on the spring, to subject the assembly to buckling forces when flexed by road shocks. Such buckling forces should be avoided not only because they stiffen the spring unnecessarily, but also because they present the danger of permanently damaging the leaf spring and the helper when subjected to road shocks. Furthermore, because of the single point suspension, my helper spring H can be made as a standard helper leaf for use on a variety of suspension systems having different overall lengths, i.e., my helper spring has universal adaptability.

The helper spring H is readily adjustable to vary the upward pressure exerted by the contact portion 19. To this end, the adjustment arm 16 is provided with a series of longitudinally spaced openings 22, each being properly sized to receive the shank of a spacer rivet 24. The shape of the helper spring is such that if it is installed without a rivet 24 in one of the openings 22, the adjustment arm 16 lies flat against the adjacent leaf spring 12, as shown by the solid line position of the arm 16 in FIGURE 2. The operative position of the pressure arm 18 is then a minimum distance from the unflexed position of the helper spring. Such unflexed position of the helper is indicated in phantom lines a distance $D_1$ above the contact portion 19.

However, if the spacer rivet 24 is installed in one of the openings 22, the adjustment arm 16 is displaced to the position shown by the dotted line position of the arm 16 in FIGURE 2. Such displacement of the arm 16 is tantamount to rocking the helper, unflexed, about the fulcrum portion 17 to a position where its free end is a greater distance $D_2$ above the desired position of the contact portion 19. Thus, when the contact portion 19 is forced into place against the adjacent portion of the leaf spring assembly, the upward pressure exerted by the contact portion 19 on the outer end of the leaf spring is much greater than obtains without the spacer 24.

From the foregoing it should be noted that since the pressure arm 18 is much longer than the adjustment arm 16, a small change in the displacement of the adjustment arm effects substantial change in the magnitude of the upward restoring pressure which the contact portion 19 exerts on the spring assembly S. Therefore, a single helper leaf of my improved design can be adjustably installed to provide a variety of restoring forces, and is accordingly adaptable to correct variety of overload conditions. For relatively light overloads, only one of my helper leaves need be applied to each spring assembly. For heavier overloads, two helper leaves can be mounted on the spring, e.g., one on either side of the axle clamp 11, as shown in FIGURE 1.

In the illustrated arrangement for effecting the single point suspension of the helper spring H, the clamping system comprises a pair of clamp plates 27, 28 (see FIGURES 2, 3 and 5) which bracket the spring assembly S and the helper H at the fulcrum. The plates 27, 28 are provided with respect to pairs of elongated slots 29, 30 for receiving bolts 31 to hold the plates 27, 28 fast against the top and bottom of the assembly.

The elongated slots 29, 30 provided on the clamp plates 27, 28 permit the helper to be mounted on spring assemblies of various widths. The lower clamp plate 27, which is mounted adjacent the fulcrum portion 17, is provided with a stub 32 which extends into an opening 33 in the fulcrum portion 17. This structure permits the limited amount of rocking necessary to effect the restoring force adjustment but prevents the clamped fulcrum portion 17 from sliding back and forth.

The leaves of most main spring assemblies are tapered so that the thickness of the overall assembly increases near the central portion which supports the axle 10. To take advantage of this tapered construction, a turn buckle 35 or other similarly adjustable linkage may be used to connect the helper clamp bolts 31 with corresponding members on the axle clamp 11. By tightening up on the turnbuckle 35, the clamp structure is wedged toward the thicker central portion of the main spring, thereby preventing the helper clamp from slipping along the longitudinal axis of the assembly.

I have also found it desirable to provide the contact end of the pressure arm with a clip 36 which loosely surrounds the end of the main spring assembly S and is firmly mounted to the helper, preferably at the contact portion 19. In FIGURES 2, 4 and 5, the clip shown comprises a U-shaped bracket 37 secured by the rivet 21 to the helper leaf H, and a removable bolt 38 extends through the ends of the legs of the bracket 36. The clip fits loosely around the main spring, in a manner to prevent any substantial vertical movement of the contact portion 19 relative to the main spring, while at the same time permitting sliding movement of the contact portion 19 as previously explained. Thus, the clip arrangement, together with the relatively smooth and soft wear pad 20, prevents noisy operation of the helper leaf during severe flexures, while at the same time permitting the axial slippage advantages that inhere in the single point suspension.

While I have illustrated and described a particular embodiment of my invention, it will be apparent that various modifications can be made without departing from the spirit and scope of my invention. For example, the desired position of the adjustment arm 16 can be established by means of a single opening to accommodate rivets having heads of different sizes. Or a slidable wedge element can be provided to be releasably fastened in any desired position along the arm. Also, as will be apparent, the shapes of the different portions of the helper spring may be varied in a number of ways. Accordingly, I do not intend that my invention shall be limited, except as by the appended claim.

I claim:

Apparatus for strengthening a leaf spring suspension system comprising: an elongated, curved stiff spring element having a reverse bend adjacent one end, said one end having spaced openings therein; means for pivotally securing said element to the system adjacent said reverse bend so that the opposite end of said element engages the adjacent portion of the system; and means for adjustably spacing said one end of said element from the system, whereby the pressure of said opposite end of said element against the system is selectively adjustable, said means including a spacer element to be wedged between said one end and the system, said spacer element having a portion releasably located in one of said openings.

References Cited in the file of this patent

UNITED STATES PATENTS

| | | |
|---|---|---|
| 10,188 | Morse | Nov. 1, 1853 |
| 1,419,098 | Arnot | June 6, 1922 |
| 2,301,398 | Haynes | Nov. 10, 1942 |
| 2,954,970 | Bernard et al. | Oct. 4, 1960 |